United States Patent [19]

Hunter

[11] 4,439,159

[45] Mar. 27, 1984

[54] SKETCHING AID

[76] Inventor: James B. Hunter, 313 Echo Valley La., Newtown Square, Pa. 19073

[21] Appl. No.: 459,984

[22] Filed: Jan. 21, 1983

Related U.S. Application Data

[63] Continuation of Ser. No. 218,450, Dec. 19, 1980, abandoned.

[51] Int. Cl.³ .............................................. G09B 11/06
[52] U.S. Cl. ..................................................... 434/85
[58] Field of Search ...................... 434/85, 88, 89, 90, 434/91, 92, 415, 416, 422; 33/1 K, 262, 277

[56] References Cited

U.S. PATENT DOCUMENTS

| | | | |
|---|---|---|---|
| 17,019 | 4/1857 | Burrell | 434/415 |
| 193,099 | 7/1877 | Shepherd | 434/416 X |
| 220,311 | 10/1879 | Shepherd | 434/88 |
| 227,662 | 5/1880 | Thompson | 434/422 |
| 333,483 | 12/1885 | Stewart | 434/88 |
| 521,833 | 6/1894 | Sullivan | 434/89 |
| 1,415,833 | 5/1922 | Ginsburg | 434/90 |
| 1,992,083 | 2/1935 | McDonald | 434/90 |
| 2,410,447 | 11/1946 | Juran | . |
| 2,521,483 | 9/1950 | Scatena | . |
| 3,045,363 | 7/1962 | Kaestle | . |
| 3,086,296 | 4/1963 | Bergstrom | . |
| 3,660,903 | 5/1972 | Caperton | . |
| 3,834,043 | 9/1974 | Summers | . |
| 3,844,049 | 10/1974 | Suvada | . |
| 4,008,528 | 2/1977 | Caulfield | . |

OTHER PUBLICATIONS

Sears Roebuck 1969 Xmas Book, Distinctive Wallets (p. 169)

Primary Examiner—Harland S. Skogquist
Attorney, Agent, or Firm—Cushman, Darby & Cushman

[57] ABSTRACT

A sketching aid is provided which includes an opaque frame mounting a rigid transparent plate, and having a slide arrangement allowing a transparent drawing film to be moved into face-to-face contact with the plate. A supply of transparent drawing films may be stored within the frame hand-held portion and a common pivotal blocking member can prevent sliding of the films out of the storage compartment and from engagement with the plate. The plate and frame may be coplanar, or may be pivoted together so that they are movable from the face-to-face position to a position wherein an angular relationship is provided. A resting bar may be adjustably mounted to the frame, facilitating support of the frame on a resting surface, and may have a drawing implement holding portion formed with it.

17 Claims, 8 Drawing Figures

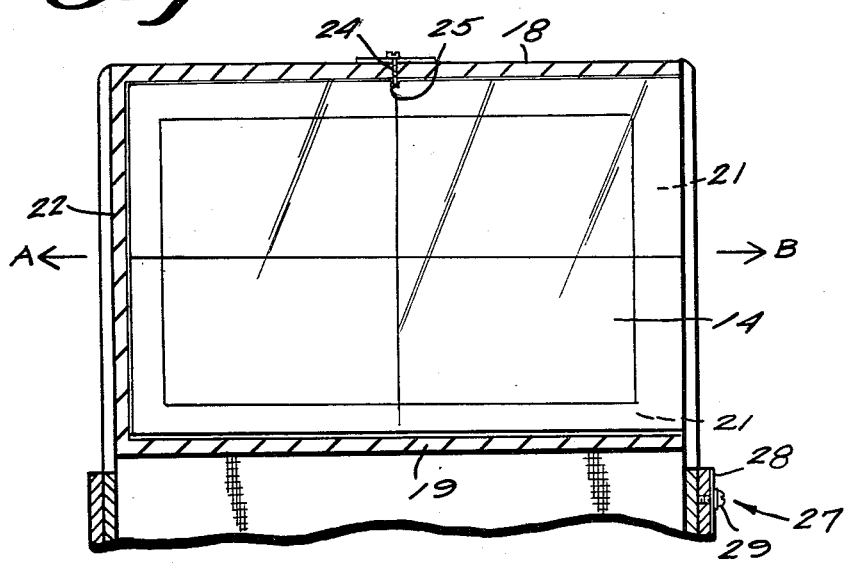
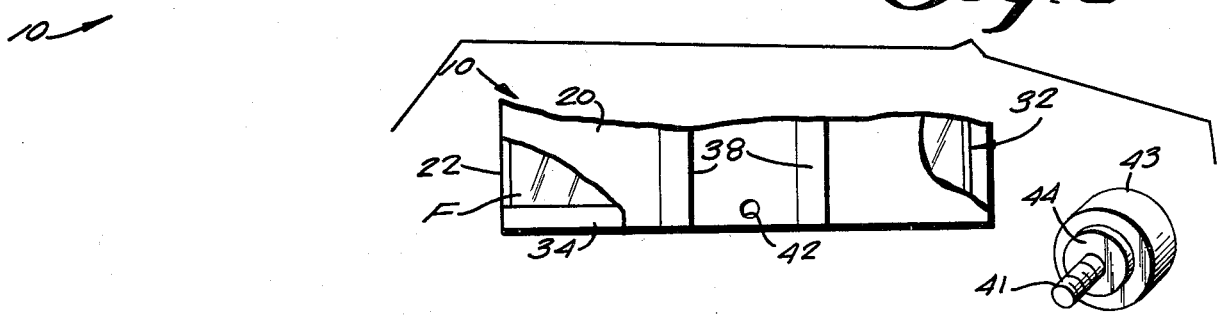
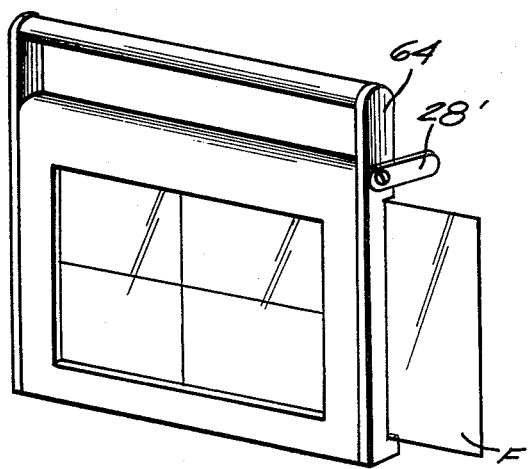
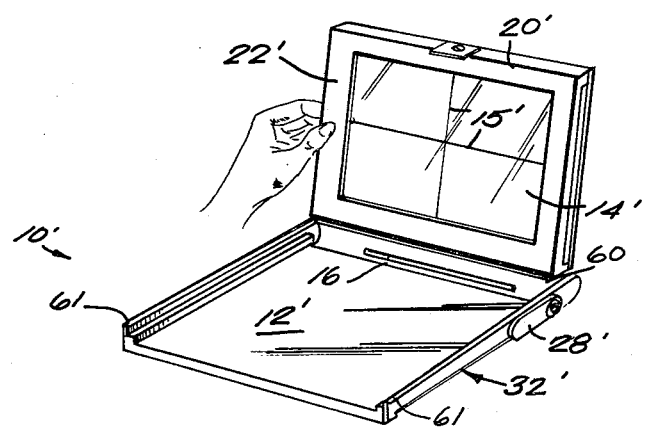

SKETCHING AID

This is a continuation of application Ser. No. 218,450, filed Dec. 19, 1980, now abandoned.

BACKGROUND AND SUMMARY OF THE INVENTION

The invention relates to a sketching aid which facilitates the sketching or drawing of a real-life scene, allowing duplication of proper perspective and proper spatial relationships between component parts of the scene to be sketched. Utilizing the present system, a skilled artist or draftsman can much more quickly, and with good accuracy, construct a perspective view of a scene or object. For a relatively unskilled artist or draftsman, it becomes possible, utilizing the sketching aid according to the present invention, to make a sketch or drawing having a much higher degree of realism than would otherwise be possible. The sketching aid according to the invention can be used by a wide variety of people, both for enjoyment or in the normal course of their profession, or in accordance with a course of study.

The sketching aid according to the present invention is constructed so that it is easy to handle and transport, is versatile, is complete, and allows the basic functions for which it is designed to be practiced readily by any user. The device according to the invention provides for storage of transparent drawing films directly with it, appropriate mounting of a drawing implement with the sketching aid, and comfortable and functional support of the aid by a single hand of the user, at any desired relative position with respect to the user.

According to one aspect of the present invention, the sketching aid comprises an opaque frame member, having a portion thereof large enough to be readily grasped by a human hand and small enough to be readily supported by a human hand alone, a rigid transparent plate, and means for operatively attaching the plate to the frame so that the plate is held stationary with respect to the frame. Means are also associated with the frame for holding a transparent drawing film, such as an acetate film of substantially the same size as the plate, in face-to-face contact with the plate. Storage means are provided for holding a supply of transparent drawing films, the storage means formed in the portion of the frame adapted to be held by the user's hand. The storage means may comprise means defining a cavity within the frame portion of substantially the same size and shape as a stack of transparent drawing films, the cavity being open on one end thereof to allow sliding movement of the films from the cavity, and a movable abutment mounted adjacent to the cavity for releasably blocking the cavity open end so that the films may not be removed.

The means for operatively attaching the plate to the frame may comprise means for pivotally mounted the plate to the frame so that it is movable from a first position wherein the frame portion adapted to be grasped by the user's hand and the plate are in parallel planes, in face-to-face relationship, to a second position wherein the plate makes an angle of between 90° and 180° with respect to the frame portion. A drawing implement may then be held between the frame portion and plate at the hinge, which hinge may comprise a flexible strip.

The plate may be considered to have x and y imaginary orthogonal axes disposed in the plane thereof, when held stationary in the frame member, with a z imaginary axis extending orthogonally to the plane of the plate. The means associated with the frame for holding a film in face-to-face contact with the plate comprises means formed intergrally with the frame preventing substantial movement of the film in either direction along the y axis, preventing movement in one direction along the z axis while the plate prevents movement in the other direction along the z axis, and preventing movement along a first direction along the x axis while allowing sliding movement of the film with respect to the frame and plate in a second direction along the x axis, opposite the first direction. A releasable blocking means is disposed at the side of the frame and actuatable by hand to either prevent or allow slidable movement of film in the second direction along the x axis. The dimensions of the film and plate are preferably about 5"×8", with the effective size of the plate and film, as defined by the frame and the attachment means, being about 4½"×6⅝".

The device may also be provided with a resting bar means for resting on a surface to steady the frame member during use of the aid. For instance the resting bar may rest on a person's lap, a table, or a like surface, to insure steady support of the aid when being used. Means are provided for mounting the resting bar to the frame member so that the position thereof with respect to the frame member is adjustable, supporting the frame member in each position to which it is moved. Means may be provided supporting a drawing implement on the resting bar means so that when the resting bar means is moved away from the frame member the drawing implement is removable, but when the resting bar means abuts the frame member the drawing implement is not removable from the aid.

It is the primary object of the present invention to provide a simple, versatile, complete, and readily transportable sketching aid. This and other object of the invention will become clear from an inspection of the detailed description of the invention, and from the appended claims.

BRIEF DESCRIPTION OF THE DRAWINGS

FIG. 5 is a longitudinal detail cross-sectional view of the frame of the devices of FIGS. 1 through 4, taken along the area of support of the transparent drawing plate;

FIG. 6 is a detail exploded view showing portions of the frame, slide track and clamping component of the devices of FIGS. 1 through 4;

FIG. 7 is a perspective view of another embodiment of the device according to the present invention shown in a transporting position thereof; and FIG. 8 is a perspective view of the device of FIG. 7 shown in use.

DETAILED DESCRIPTION OF THE DRAWINGS

Figure 1:
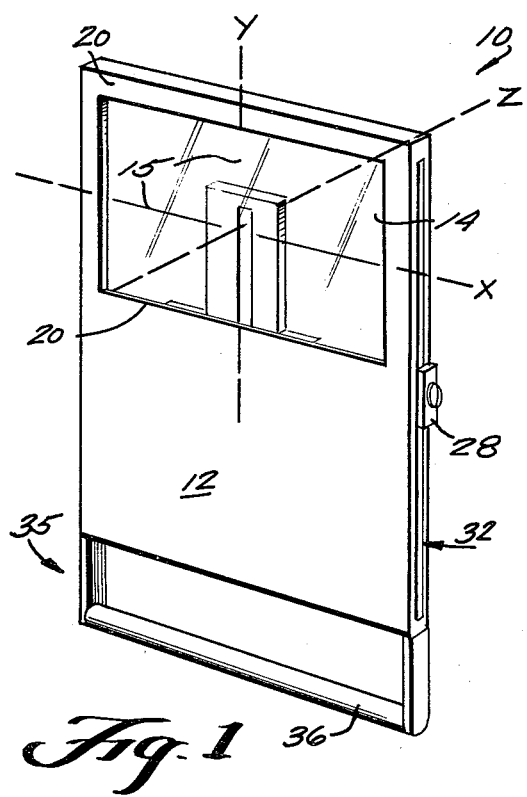
FIG. 1 is a perspective view of a first embodiment of a device according to the present invention, shown in a transporting position thereof.

Two main embodiments of the sketching aid according to the present invention are shown in the transporting and use positions thereof, respectively, in FIGS. 1 and 7 and FIGS. 2 and 8. Both these embodiments have many features in common, including a frame member 10, 10' having a portion 12, 12' thereof, a rigid transparent plate 14, 14', means for attaching the plate 14 to the frame 10, and means associated with the frame 10 for holding a transparent drawing film F (see FIG. 7) in face-to-face contact with the plate 14. The two embodiments differ primarily in the exact manner in which they are held during use, and in the particular spatial relationship between the plate 14, 14' and the frame hand-held portion 12, 12'.

In both embodiments the rigid transparent plate 14, 14' preferably is of a thick transparent plastic, such as Lucite, and has a crosshair 15, 15' formed thereon to facilitate repeated proper positioning of the device relative to an object or scene to be sketched. The transparent film F may comprise a thin flexible acetate film, such as a 10 mil acetate film, both the plate 14, 14' and the film F being about 5"×8". A drawing implement, such as a pen 16, preferably is transportable directly with the sketching aid. The pen may comprise a particular type of ink pen having water insoluble ink that readily traces on acetate film. However the ink should be removable by some solvent, such as alcohol, allowing ready correction of a drawing yet insuring that the drawing will not be smudged by water. A typical pen, with ink, for this purpose is a Schwan Stabilo 96 P.

Figure 2:
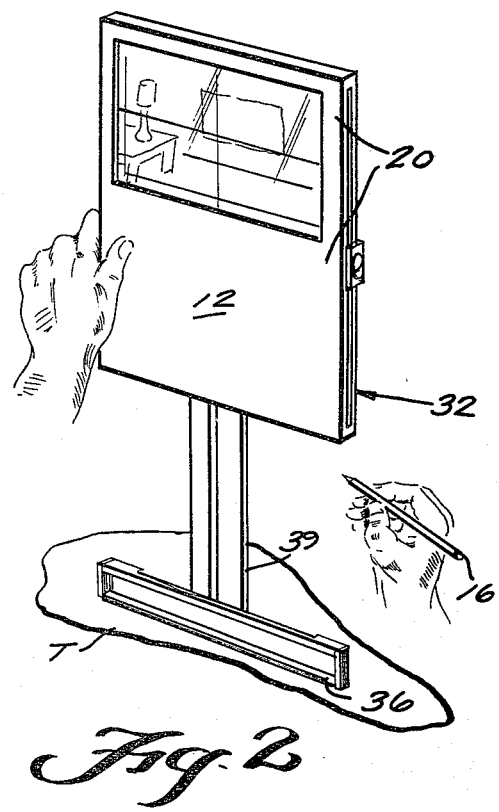
FIG. 2 is a perspective view of the device of FIG. 1 shown in a position of use.
Figure 3:
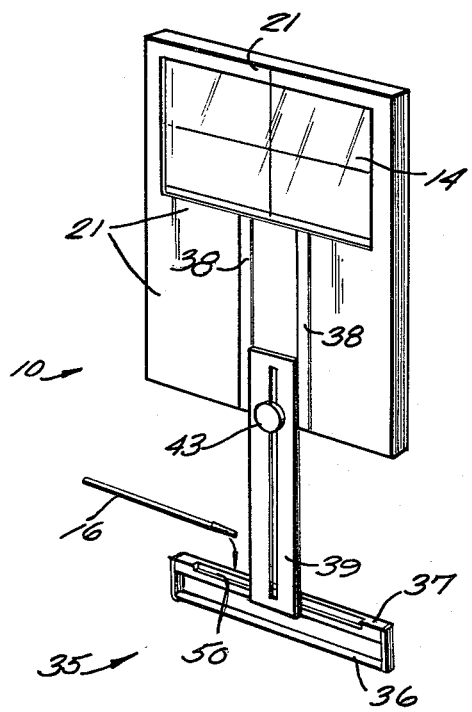
FIG. 3 is a perspective view of the opposite side of the device of FIG. 2.

In the embodiment illustrated in FIGS. 1 through 6, the plate 14 and the frame hand-held portion 12 are substantially coplanar. Means for operatively attaching the plate to the frame so that the plate is held stationary with respect to the frame preferably comprises particularly formed abutment means integral with the frame 10. With particular reference to FIGS. 1, 3, and 5, abutments 18, 19, 20, 21, and 22 are provided. The abutments 18 and 19 prevent movement of the plate 14 in either direction in an imaginary y axis (see FIG. 1), while abutments 20 and 21 prevent movement of the plate 14 in an imaginary z axis. The abutment 22 prevents movement of the plate 14 in a first direction A (see FIG. 5) in an x axis, while no abutment is provided opposite abutment 22 so that movement of the plate 14 in a second direction B along the x axis is allowed. The abutments 18, 19, 20, 21, and 22 together collectively define a volume of substantially the same size as the plate 14 (only being slightly "thicker" to allow the insertion of a transparent film F in face-to-face engagement with the plate 14), and define an effective area of the plate 14 of about 4½"×6⅝" (where the plate is 5"×8"). A releasable fastener, such as a screw 24 passing through top abutment 18 (see FIG. 5) engages a notch 25 formed in plate 14, and prevents movement of the plate in direction B. However when screw 24 is unthreaded from engagement with notch 25, the plate 14 may be removed for replacement, repair, or cleaning thereof.

In the embodiments of FIGS. 1 through 6, the transparent film F is insertable and removable into and from face-to-face relationship with the plate 14 in the same manner that the plate 14 is removable. That is, the film F can be moved in direction A along the x axis, and is removed in direction B. When in face-to-face engagement with the plate 14, movement of the film F is restrained in the y axis by the abutments 18 and 19, in the direction A in the x axis by the abutment 22, in one direction in the z axis by the abutment 20, and in the other direction in the z axis by the plate 14. A releasable blocking mean, shown generally at 27 (see FIG. 5) is disposed at a side of the frame and is actuatable by hand to either prevent or allow slidable movement of the film F in direction B. For instance the blocking means 27 may be a tab 28 mounted for pivotal movement about an axis parallel to the x axis by screw 29, in the position thereof illustrated in FIG. 5 blocking movement of the film from out of engagement with the plate 14, and pivotal from the position illustrated in FIG. 5 to a position wherein tab 28 does not block movement of the film. The abutments 18, 19, 20, and 22, the plate 14 and the blocking means 27, collectively define means associated with the frame 10 for holding the film F in face-to-face contact with the plate 14.

In the embodiment illustrated in FIGS. 1 through 6, a storage means is provided for holding a supply of transparent films F. The storage means preferably comprises means defining a cavity within the frame portion 12 of substantially the same size and shape as a stack of films. The cavity is opened at one end thereof to allow sliding movement of the films into and from the cavity. The open end of the cavity can be seen generally at reference numeral 32 in FIGS. 1, 2, and 6. The cavity, other portions of which can be seen in FIG. 6 holding a film F, may be defined on the top thereof by the abutment 19, on one side of an x axis thereof by the abutment 22, on the bottom thereof by an abutment 34 (see FIG. 6), and on opposite faces perpendicular to the z axis by plates forming the hand-held frame portion 12, which plates are coextensive with the abutments 20, 21, and which are also illustrated by reference numerals 20 and 21 in the drawings. A movable abutment is mounted adjacent to the cavity entrance 32 for releasably blocking the entrance 32 so that the films F may not be removed, and this movable abutment can also be defined by the pivoted tab 28, as illustrated in FIG. 5. A film F may thus be removed from the cavity through entrance 32 by moving it in direction B (with tab 28 in a movement-allowing position) may be inserted into face-to-face relationship with the plate 14 by moving it in direction A, and may be removed from face-to-face contact with the plate 14 in direction B.

The embodiment illustrated in FIGS. 1 through 6 also include a resting bar means illustrated generally at 35, for supporting the frame 10 on a surface, and in an operative position. A handle 36 may be attached to a cross-bar 37 of the resting bar means for ease of transport of the sketching aid, and the handle 36 may be placed on a person's lap, or on a stationary surface, to properly support the frame 10 and plate 14 and steady them for drawing during use. For instance in FIG. 2, the handle 36 is shown supported by a table T. Means are also provided for mounting the cross-bar 37 to the frame member 10 so that the position of the cross-bar 37 with respect to the frame member is adjustable, supporting the frame member 10 in each position to which it is moved. In the embodiment illustrated in the drawings, with particular reference to FIGS. 3 and 6, this mounting means comprises a pair of rigid material strips 38 defining a track therebetween, on the frame panel 20, and a slide 39 attached to the cross-bar 37 and disposed in the track defined by the strips 38. The slide 39 has a central slot 40 defined therein. Clamping means are also provided, having a screw-threaded shaft 41 (see FIG. 6) which is in threaded engagement with a screw-threaded opening 42 formed in panel 20 and abutment 34. A clamping head 42 is rigidly attached to the shaft 41, and a knob 43 is integral with the clamping head 42. When the knob 43 is rotated so that the shaft 41 engages the threaded opening 42 to move the clamping head 44 away from the frame 10, the slide 39 may move within the track defined by the strips 38, the slot 40 being wide enough with respect to the fastener so that the slide 39 moves linearly with respect to the fastener 41 also. However when the knob 43 is rotated (e.g. clockwise) so that the clamping head 44 is moved into engagement with the slide 39, the head 44 clamps the slide 39 against the face plate 30 between the strips 38, and prevents relative movement of the cross-bar 37 with respect to the frame 10.

Preferably means are provided for supporting a drawing implement 16 on the cross-bar 37 so that when the cross-bar 37 is moved away from the frame 10 the drawing implement 16 is removable, but when the cross-bar 37 abuts the frame 10 the drawing implement 16 is not removable. With particular reference to FIG. 3, such drawing implement supporting means preferably comprises means defining a recess 50 in the portion of cross-bar 37 closest to frame 10, the recess 50 being open at the face of the cross-bar 37 closest to the frame 10, and being open along one side face thereof, except for the slide 39. Thus, in the position illustrated in FIG. 3, the drawing implement may be snapped into or snapped out of the recess 50, while in the position illustrated in FIG. 1 the frame 10 will prevent movement of the drawing implement 16 out of the recess 50.

Figure 4:
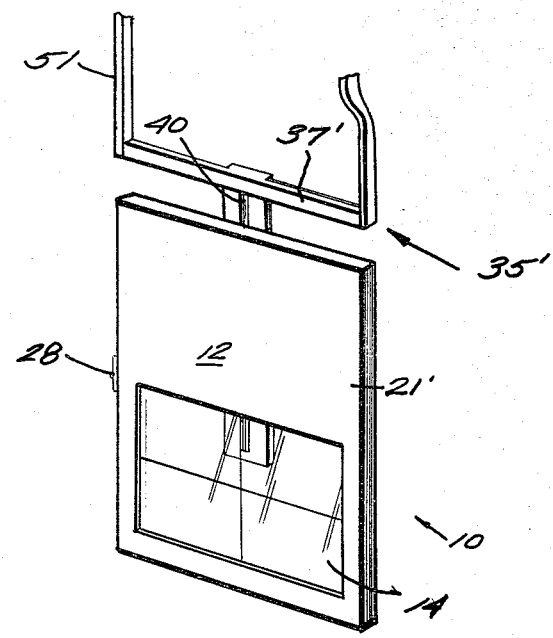
FIG. 4 is a perspective view of the second embodiment of the device according to the present invention, shown in a transporting position thereof.

In the modification illustrated in FIG. 4, the resting bar means 35' are slightly different. In this case the cross-bar 37' has no handle attached thereto, but rather is merely a straight bar. In order to facilitate carrying of the sketching aid, a strap 51 may be attached to the cross-bar 37'. However, it is not even necessary to provide any accessory carrying aid, but rather merely the cross-bar 37' may be adjusted in position with respect to the frame 10 as illustrated in FIG. 4, and the cross-bar 37' itself grasped to facilitate carrying of the sketching aid around. For this modification, a recess provided in the cross-bar 37' for holding a drawing implement would be slightly different than the recess 50.

In the embodiment illustrated in FIGS. 7 and 8, the means for operatively attaching the plate 14' to the frame portion 12' comprises means for mounting the plate 14' for pivotal movement with respect to the frame portion 12' from a first position (FIG. 7) wherein the frame portion 12' and plate 14' are in parallel planes, in face-to-face relationship, to a second position (FIG. 8) wherein the plate 14' makes an angle of between 90° and 180° with respect to the frame portion 12'. FIG. 7 illustrates the transporting position of the device, while FIG. 8 illustrates the user position thereof. The pivotal means preferably comprises a strap 60 of flexible material attached along opposite sides thereof to abutments 21' framing the plate 14', and to the frame portion 12'. The frame portion 12' may include side lips 61 for receiving the abutment framing the plate 14'.

In the FIGS. 7 and 8 embodiment, the film storage and drawing plate support are substantially the same as in the FIGS. 1 through 6 embodiment, like structures being indicated by like reference numerals, only in the FIGS. 7 and 8 embodiment the reference numeral being followed by a "'". In the FIGS. 7 and 8 embodiment, however, it is not possible to provide a common blocking member for preventing withdrawal of film F from the film storage cavity through opening 32', and from face-to-face relationship with the plate 14'. Thus, a separate tab 28', mounted by pivot pin 29', is provided for the film storage cavity, while a separate pivot tab or separate slide (not shown) may be provided for the means for holding the film in contact with the plate 14'.

As illustrated in FIGS. 7 and 8, a handle 63 may also be provided for facilitating transportation of the sketching aid. The handle 63 would be supported by extension 64 of the sides of the frame portion 12'. The drawing implement 16 is held in this embodiment at the flexible strap 60 when the device is in the transporting position thereof.

In the FIGS. 7 and 8 embodiment, proper support of the plate 14' for sketching is facilitated by the adjustable angular relationship between the plate 14' and frame portion 12', so that a resting bar (such as structure 35 in FIG. 3) is not necessary in order to effectively support the plate 14' during use.

The exemplary device according to the present invention having been described, a particular manner of utilization thereof will now be described, with particular reference to FIGS. 1 through 3.

The user grasp handle 36 and transports the sketching aid to any desired location. Once he/she arrives at a location, he/she pivots tab 28 to an unblocking position, removes a film F through cavity open end 32, inserts the film F (by moving it in direction A) into face-to-face contact with the plate 14, and moves the tab 28 back to its blocking position. Then he/she rotates the knob 43 counterclockwise until the clamping head 44 no longer tightly engages the slide 39, moves the slide 39 to any desired relative position with respect to the frame 10 (e.g. the position of FIGS. 2 and 3), and rotates the knob 43 clockwise to tighten the head 44 onto the slide 39 and hold it in that position. The sketching aid is now ready for use.

Once the aid is ready for use, the user removes the drawing implement 16 from recess 50, rests the handle 36 on any suitable surface (e.g. table T), and sights the scene or object to be sketched through the plate 14 with overlying film F. Using the implement 16 (see FIG. 2) the user merely traces over the structures in the scene or object that are visible through the plate 14, impressions being formed directly on the film F.

Once the sketch is completed, the tab 28 is moved to its unblocking position, and the film is moved in direction B from face-to-face contact with the plate 14. The film may then be acted upon in any other manner, such as forming other drawings from it, detailing the drawing, coloring it, etc., and it may be transferred to any other suitable medium utilizing conventional techniques. If correction of any of the markings on the film are necessary at any stage during the process, a rag or other structure soaked in alcohol is placed in contact with the errant marking on the film F, and it is removed.

It will thus be seen that according to the present invention a simple, versatile, and complete sketching aid has been provided which is utilizable for a wide variety of purposes to construct accurate perspective drawings of actual scenes or objects. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed:

1. A sketching aid comprising:
   an opaque frame member having a first portion thereof large enough to be readily grasped by a human hand, and small enough to be readily supported by a human hand alone, and a second portion distinct from said first portion and comprising means defining an opening therein extending from one side to the other;
   a rigid transparent plate;
   means for operatively attaching said rigid transparent plate to said opaque frame, and within said frame opening, so that said plate is held stationary with respect to said frame, and so that one can view through the frame opening and transparent plate objects on one side of the plate from the other side of the plate;
   means associated with said frame for holding a transparent drawing film of substantially the same size as said rigid transparent plate in face-to-face contact with said plate; and
   storage means for holding a supply of transparent drawing films, said storage means formed in said first portion of said opaque frame member.

2. A sketching aid as recited in claim 1 wherein x and y imaginary orthogonal axes are disposed in the plane of said plate when held stationary in said frame member, and wherein a z imaginary axis extends orthogonal to the plane of said plate when held stationary in said frame member, and wherein said means for operatively attaching said plate to said frame comprise abutment means formed integrally with said frame for preventing substantial movement of said plate in either direction along either said y and z axes, and in a first direction along said x axis while allowing sliding movement of said plate in a second direction along said x axis, opposite said first direction, and a releasable fastener engaging said plate for releasably preventing movement of said plate in said second direction along said x axis.

3. A sketching aid as recited in claim 2 wherein said first portion of said frame member comprises a substantially planar portion; and wherein said storage means comprises means defining a cavity within said frame first portion of substantially the same size and shape of a stack of transparent drawing films, said cavity being open on one end thereof to allow sliding movement of the films from the cavity.

4. A sketching aid as recited in claim 3 wherein said plate is substantially coplanar with said frame member portion first hand, and wherein said open end of said cavity provides for slidable movement of films in the same direction as said x-axis second direction.

5. A sketching aid as recited in claim 1 wherein said first portion of said frame member comprises a substantially planar portion; and wherein said storage means comprises means defining a cavity within said frame first portion of substantially the same size and shape of a stack of transparent drawing films, said cavity being open on one end thereof to allow sliding movement of the films from the cavity.

6. A sketching aid as recited in claim 1 wherein said means for operatively attaching said plate to said frame comprises means for mounting said plate for pivotal movement with respect to said frame from a first position wherein said first frame portion and said plate are in parallel planes, in face-to-face relationship, to a second position wherein said plate makes an angle of between 90°–180° with respect to said first frame portion.

7. A sketching aid as recited in claim 4 wherein said movable abutment comprises a pivoted latch having a blocking portion extending in opposite directions away from a central, pivoted, portion thereof, one blocking portion blocking sliding movement of said film when in said cavity, and the other blocking portion simultaneously blocking slidable movement of a film disposed in face-to-face engagement with said plate in said x-axis second direction.

8. A sketching aid as recited in claim 1 wherein x and y imaginary orthogonal axes are disposed in the plane of said plate when held stationary in said frame member, and wherein a z imaginary axis extends orthogonal to the plane of said plate when held stationary in said frame member; and wherein said means associated with said frame for holding a transparent film of substantially the same size as said plate in face-to-face contact with said plate comprises means formed integrally with said frame preventing substantial movement of film in face-to-face contact with said plate in either direction along said y axis, and preventing movement in one direction along said z axis while said plate prevents movement in the other direction along said z axis, and preventing movement along a first direction along said x axis while allowing sliding movement of the film in a second direction along said x axis, opposite said first direction.

9. A sketching aid as recited in claim 1 wherein the effective size of said plate, as defined by said frame and said means for attaching said plate to said frame, is about $4\frac{1}{2}'' \times 6\frac{5}{8}''$.

10. A sketching aid as recited in claim 1 further comprising a resting bar means for resting on a surface to steady said frame member during use of the aid, and means for mounting said resting bar means to said frame member so that the position thereof with respect to said frame member is adjustable, supporting said frame member in each position to which it is moved.

11. A sketching aid as recited in claim 10 further comprising means for supporting a drawing implement on said resting bar means so that when said resting bar means is moved away from said frame member the drawing implement is removable, but when said resting bar means abuts said frame member the drawing implement is not removable.

12. A sketching aid as recited in claim 10 wherein said means for mounting said resting bar means so that the position thereof is adjustable comprises means defining a track on said frame member portion adapted to be grasped by a human hand; a slide integral with said resting bar means and disposed in said track for slidable movement with respect thereto, said slide have a central slot; and clamping means having a screw-threaded shaft and a clamping head, said shaft in threaded engagement with said frame member and passing through said central slot so that when said shaft is rotated to move said clamping head toward said frame member it abuts said slide and frictionally holds it in position against said frame member, and so that when said shaft is rotated to move said clamping head away from said frame member it does not abut said slide, and allows relative movement between said slide and said frame member.

13. A sketching aid comprising:
   an opaque frame member, having a first portion thereof large enough to be readily grasped by a human hand, and small enough to be readily supported by a human hand alone, and a second portion distinct from said first portion and comprising means defining an opening therein extending from one side to the other;

a rigid transparent plate;

means for operatively attaching said rigid transparent plate to said opaque frame, and within said frame opening, as the only element stationarily within said frame opening, so that said plate is held stationary with respect to said frame, and so that at all times one can view through the frame opening and transparent plate an object on one side of the plate from the other side of the plate;

means associated with said frame for holding a transparent drawing film of substantially the same size as said rigid transparent plate in face-to-face contact with said plate;

a resting bar means for resting on a surface to steady said frame member during use of said aid; and means for mounting said resting bar means to said frame member so that the position thereof with respect to said frame member is adjustable, supporting said frame member in each position to which it is moved.

14. A sketching aid as recited in claim 13 further comprising means for supporting a drawing implement on said resting bar means so that when said resting bar means is moved away from said frame member the drawing implement is removable, but when said resting bar means abuts said frame member the drawing implement is not removable.

15. A sketching aid as recited in claim 14 wherein said means for mounting said resting bar means so that the position thereof is adjustable comprises means defining a track on said frame member portion adapted to be grasped by a human hand; a slide integral with said resting bar means and disposed in said track for slidable movement with respect thereto, said slide have a central slot; and clamping means having a screw-threaded shaft and a clamping head, said shaft in threaded engagement with said frame member and passing through said central slot so that when said shaft is rotated to move said clamping head toward said frame member it abuts said slide and frictionally holds it in position against said frame member, and so that when said shaft is rotated to move said clamping head away from said frame member it does not abut said slide, and allows relative movement between said slide and said frame member.

16. A sketching aid as recited in claim 13 wherein said resting bar means comprises a cross-bar, and further comprising means defining a recess in said cross-bar for holding a drawing implement.

17. A sketching aid comprising:

an opaque frame member, having a portion thereof large enough to be readily grasped by a human hand, and small enough to be readily supported by a human hand alone;

a rigid transparent plate;

means for operatively attaching said rigid transparent plate to said opaque frame so that said plate is held stationary with respect to said frame;

means associated with said frame for holding a transparent drawing film of substantially the same size as said rigid transparent plate in face-to-face contact with said plate;

a resting bar means for resting on a surface to steady said frame member during use of said aid; and means for mounting said resting bar means to said frame member so that the position thereof with respect to said frame member is adjustable, supporting said frame member in each position to which it is moved, said means comprising: means defining a track on said frame member portion adapted to be grasped by a human hand; a slide integral with said resting bar means and disposed in said track for slidable movement with respect thereto, said slide having a central slot; and clamping means having a screw-threaded shaft and a clamping head, said shaft in threaded engagement with said frame member and passing through said central slot so that when said shaft is rotated to move said clamping head toward said frame member it abuts said slide and frictionally holds it in position against said frame member, and so that when said shaft is rotated to move said clamping head away from said frame member it does not abut said slide, and allows relative movement between said slide and said frame member.

* * * * *